United States Patent
Eiha et al.

(10) Patent No.: US 7,594,808 B2
(45) Date of Patent: Sep. 29, 2009

(54) MOLD AND MOLDING METHOD

(75) Inventors: Noriko Eiha, Kanagawa (JP); Seiichi Watanabe, Kanagawa (JP); Yasuhito Hiraki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/650,960

(22) Filed: Jan. 9, 2007

(65) Prior Publication Data
US 2007/0164465 A1  Jul. 19, 2007

(30) Foreign Application Priority Data
Jan. 19, 2006 (JP) .................. 2006-011519

(51) Int. Cl.
*B29D 11/00* (2006.01)

(52) U.S. Cl. ................. 425/412; 425/400; 425/416; 425/451.7; 425/451.9; 425/808; 264/1.1; 264/1.32; 264/40.5; 65/305; 65/323

(58) Field of Classification Search ........... 425/168, 425/193, 195, 352, 395, 408, 411, 412, 415, 425/423, 450.1, 466, 467, 808, 190, 191, 425/192 R, 400, 406, 416, 451.9, 451.7, DIG. 129; 264/40.5, 1.24, 1.32, 325, 1.1, 2.5; 65/102, 65/305, 323
See application file for complete search history.

(56) References Cited

U.S. PATENT DOCUMENTS 3,720,491 A * 3/1973 Dedek ..................... 425/78
4,778,505 A * 10/1988 Hirota et al. ............. 65/102
5,110,278 A * 5/1992 Tait et al. .................. 425/175
5,788,732 A * 8/1998 Nomura et al. ........... 65/64
5,882,698 A * 3/1999 Su et al. .................... 425/215
6,071,111 A * 6/2000 Doke et al. ................ 425/412
7,313,930 B2 * 1/2008 Kainuma et al. .......... 65/102
2003/0121286 A1* 7/2003 Takagi et al. ............. 65/64
2004/0134232 A1* 7/2004 Kainuma et al. .......... 65/32.5
2007/0166426 A1* 7/2007 Eiha et al. ................ 425/412

FOREIGN PATENT DOCUMENTS

| JP | 62096329 A | * | 5/1987 |
| JP | 01024029 A | * | 1/1989 |
| JP | 02196039 A | * | 8/1990 |
| JP | 2002225086 A | * | 8/2002 |
| JP | 2003175532 A | * | 6/2003 |
| JP | 2003-231159 A | | 8/2003 |

\* cited by examiner

*Primary Examiner*—Philip C Tucker
*Assistant Examiner*—Dimple N Bodawala
(74) *Attorney, Agent, or Firm*—Sughrue Mion, PLLC

(57) ABSTRACT

A mold for molding a product in a cavity formed by closing the mold includes a first half; a second half; and a plurality of aligning members which come in contact with each side circumferential surface of the first half 100 and the second half at least in three directions, when the mold is closed. After the mold is closed, at least one of the aligning members is moved to contact the aligning member with the each side circumferential surface of the first half and the second half, which enables a center axis alignment between the first half and the second half.

12 Claims, 7 Drawing Sheets

MOLD AND MOLDING METHOD

CROSS REFERENCE TO RELATED APPLICATIONS

This application claims the benefit of Japanese Patent Application No. 2006-011519 filed on Jan. 19, 2006, the disclosure of which is incorporated herein by reference.

BACKGROUND OF THE INVENTION

1. Field of the Invention

The present invention relates to a mold for molding a product in a cavity formed by closing the mold, and a molding method using the mold.

2. Description of the Related Art

Optical components such as those for a digital camera, a telescopic lens, and a small-sized high-resolution camera lens for a mobile phone require a high level of accuracy in an eccentricity quantity of each center position (referred to as an interplanar eccentricity hereinafter) of two opposing optical surfaces, a shape of the optical surfaces, and a lens thickness. Of these, accuracy in the shape of the optical surfaces has almost reached a satisfactory level along with an improved accuracy in machining a mold. In the meantime, it is desired to improve accuracy in the interplanar eccentricity of the optical surfaces and in the lens thickness.

As a mold capable of manufacturing an optical component with high accuracy, for example, as shown in FIG. 8A and FIG. 8B, a mold 500 has been known which has a cavity C provided between a first half 600 and a second half 700 and formed by closing the mold 500, and a product is injection-molded in the cavity (see, for example, Japanese Published Patent Application No. 2003-231159, paragraphs 0021-0022, FIG. 1).

The first half 600 includes an insert member 610 having a cavity surface 610a; and a body member 620 for holding the insert member 610 from outside and having a reversely tapered part 621 on a lower end face 622 thereof on the side of the second half 700.

The second half 700 includes an insert member 710 having a cavity surface 710a; and a body member 720 for holding the insert member 710 from outside and having a tapered protrusion 721 on an upper end face 722 thereof on the side of the first half 600.

The mold 500 is configured such that, when the reversely tapered part 621 and the tapered protrusion 721 are fitted in with each other, a center axis alignment is achieved between the insert member 610 of the first half 600 and the insert member 710 of the second half 700.

In the conventional mold 500 described above, as shown in FIG. 8A, if a space S1 is left between the lower end face 622 of the first half 600 and the upper end face 722 of the second half 700, accuracy in the thickness of a product is lowered. Further, if the space S1 is relatively large, a material fed into the cavity C may flow out through the space S1, which results in generating a burr on the molded product. Therefore, as shown in FIG. 8B, the mold 500 is designed so as not to leave any space between the lower end face 622 of the first half 600 and the upper end face 722 of the second half 700, when the mold 500 is closed.

However, if the mold 500 is machined so as to contact the lower end face 622 of the first half 600 with the upper end face 722 of the second half 700, it is difficult to make an inclination of a tapered surface of the reversely tapered part 621 exactly the same as that of the tapered protrusion 721, due to an influence of dimensional tolerance during machining. Thus a space S2 in a lateral direction may be disadvantageously left between the tapered surfaces on the reversely tapered part 621 and the tapered protrusion 721. This results in an inaccurate center axis alignment between the first half 600 and the second half 700 to thereby lower the accuracy in the interplanar eccentricity of the molded product.

As described above, there is a problem in the conventional mold 500 that it is difficult to improve accuracy both in the thickness and in the interplanar eccentricity of the product, which lowers accuracy in molding the product.

SUMMARY OF THE INVENTION

It is desirable to provide a mold having an improved accuracy both in the thickness and in the interplanar axis alignment of a product.

The present invention provides a mold for molding a product in a cavity formed by closing the mold. The mold includes a first half and a second half each having a cavity surface; and a plurality of aligning members which come in contact with each side circumferential surface of the first half and the second half in at least three directions, when the mold is closed. After the mold is closed, at least one of the aligning members is moved to contact the aligning members with the each side circumferential surface of the first half and the second half. This enables the center axis alignment between the first half and the second half.

Thus, in the mold described above, accuracy in the center axis alignment between the first half and the second half can be provided, because it is not affected by the dimensional tolerance of each fitted part of the first half and the second half. By contrast, in the conventional mold, each fitted part of the first half and the second half provides the center axis alignment therebetween. The mold according to the present invention can be therefore configured such that the first half and the second half are closely fitted in with each other, leaving no space therebetween in a mold opening/closing direction. This enables an improved accuracy in the thickness and in the center axis alignment therebetween, namely, the interplanar eccentricity of the product.

Further, it is not necessary to machine a fitted part such as a tapered part and a reversely tapered part with high precision, on the first half and the second half, this enables a cost reduction in manufacturing the mold.

In the conventional mold, if the center axis alignment between the first half and the second half is performed in the course of closing the mold, using the fitted parts provided on the mold, the fitted parts slide against each other to be worn down. This results in a shorter period of endurance of the mold, and a lower accuracy in the center axis alignment between the first half and the second half. On the other hand, in the mold according to the present invention, the aligning members come in contact with each side circumferential surface of the first half and the second half to achieve the center axis alignment therebetween. This can prevent the aligning members and the side circumferential surfaces of the first half and the second half from sliding against each other, and can also provide a longer period of endurance of the mold and an improved accuracy in the center axis alignment therebetween.

A mechanism to move the aligning members includes, for example, various types of actuators such as various direct acting cylinders (an air cylinder, a hydraulic cylinder, a solenoid coil, or the like), a piezoelectric element, and a spring member. However, the mechanism to move the aligning members is not limited to the aforementioned, and but may include those which use a restoring force of a shape memory alloy to push out the aligning members, or an expansive force of a hollow member into which a fluid such as air is injected to push out the aligning members.

In the mold according to the present invention, the first half includes a concave part having one cavity surface, and the second half includes an insertion part having the other cavity surface. After the mold is closed, in a state where the insertion part is inserted into the concave part, at least one of the aligning members is pressed against an inner circumferential surface of the concave part and an outer circumferential surface of the insertion part. Thus each of the aligning members are made to come in contact with the inner circumferential surface of the concave part and the outer circumferential surface of the insertion part, to thereby achieve the center axis alignment between the first half and the second half.

This enables each of the aligning members to be inserted into a space having the same width, which is provided between the concave part and the insertion part. This means that each of the aligning members can have the same shape. A plurality of aligning members having the same shape can be easily manufactured. This also enables an improved accuracy in the center axis alignment between the first half and the second half, because each of the aligning members can be uniformly pressed against the inner circumferential surface of the concave part and the outer circumferential surface of the insertion part.

In the mold described above, each of the aligning members can be configured to move in a mold-closing direction to thereby come in contact with the inner circumferential surface of the concave part and the outer circumferential surface of the insertion part.

With this configuration, the center axis alignment between the first half and the second half can be performed by moving the aligning members in the mold opening/closing direction. This is advantageous for arranging a plurality of the molds, allowing an increase of the number of the molds which can be arranged in a given area.

In the mold described above, it is possible to form a tapered surface on the inner circumferential surface of the concave part for guiding the aligning members toward the outer circumferential surface of the insertion part. It is also possible to form a tapered surface on the outer circumferential surface of the insertion part for guiding the aligning members toward the inner circumferential surface of the concave part.

With this configuration, the aligning members, to which a force in the mold-closing direction is applied, can be smoothly inserted between the concave part and the insertion part.

The tapered surface formed on the inner circumferential surface of the concave part or the outer circumferential surface of the insertion part includes, but not limited to, a conic surface and an inverted conic surface made by tapering an entire circumference of the inner circumferential surface of the concave part or of the outer circumferential surface of the insertion part; a plurality of planar tapered surfaces formed in series; and a portion of a planar tapered surface or of a conic surface formed on a portion of the inner circumferential surface of the concave part and the outer circumferential surface of the insertion part.

The present invention also provides a molding method using the mold described above. The molding method is configured such that, after the aligning members achieve the center axis alignment between the first half and the second half, a mold clamping force is applied to the first half and the second half.

With this configuration, after the mold is closed, and the center axis alignment between the first half and the second half, both in the movable state, is achieved, the mold clamping force is applied to the first half and the second half to be thereby firmly pressed against each other.

Other features and advantages of the present invention will become more apparent from the following detailed description of the invention, when taken in conjunction with the accompanying exemplary drawings.

BRIEF DESCRIPTION OF THE DRAWINGS

FIG. 1A is a plan view showing the mold before a center axis alignment is performed. FIG. 1B is a cross sectional view showing the mold when cut along the line A-A in FIG. 1A.

FIG. 2A is a plan view showing the mold after the center axis alignment is performed. FIG. 2B is a cross sectional view showing the mold when cut along the line B-B in FIG. 2A.

FIG. 5 are views each showing a mold having another configuration according to the first embodiment.

FIG. 7A is a cross sectional view showing the mold before a center axis alignment is performed. FIG. 7B is a cross sectional view showing the mold after a center axis alignment is performed.

FIG. 8A is a cross sectional view showing a state where a space is left between each half in a mold opening/closing direction. FIG. 8B is a cross sectional view showing the state where a space is left between each half in a lateral direction.

DETAILED DESCRIPTION OF EXEMPLARY EMBODIMENT

Figure 1A:
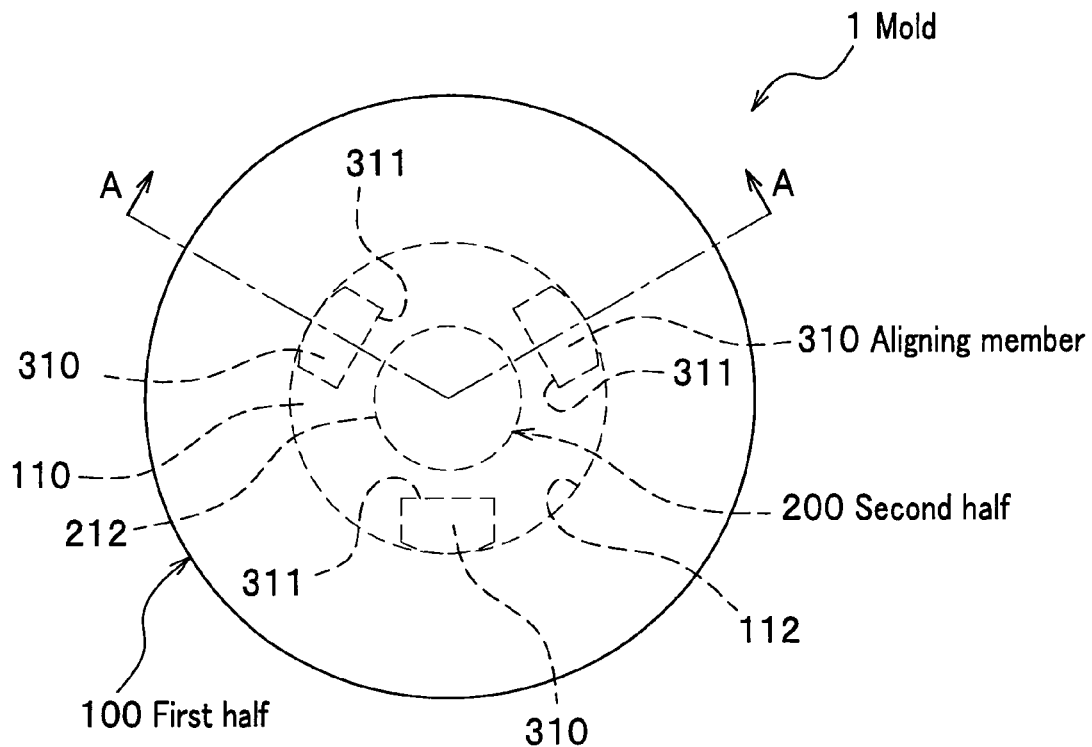
FIG. 1A and FIG. 1B are views each showing a mold according to a first embodiment of the present invention.

With reference to the attached drawings, a first embodiment of the present invention is described next in detail.

It is to be noted that the same reference numerals are assigned to the same components in embodiments to be described hereinafter, and the overlapped description is omitted.

In the embodiments, the description is made assuming that the present invention is applied to manufacturing a plastic optical lens (hereinafter referred to as a lens).

First Embodiment

First is described a mold and a molding method using the mold according to a first embodiment.

Figure 1B:
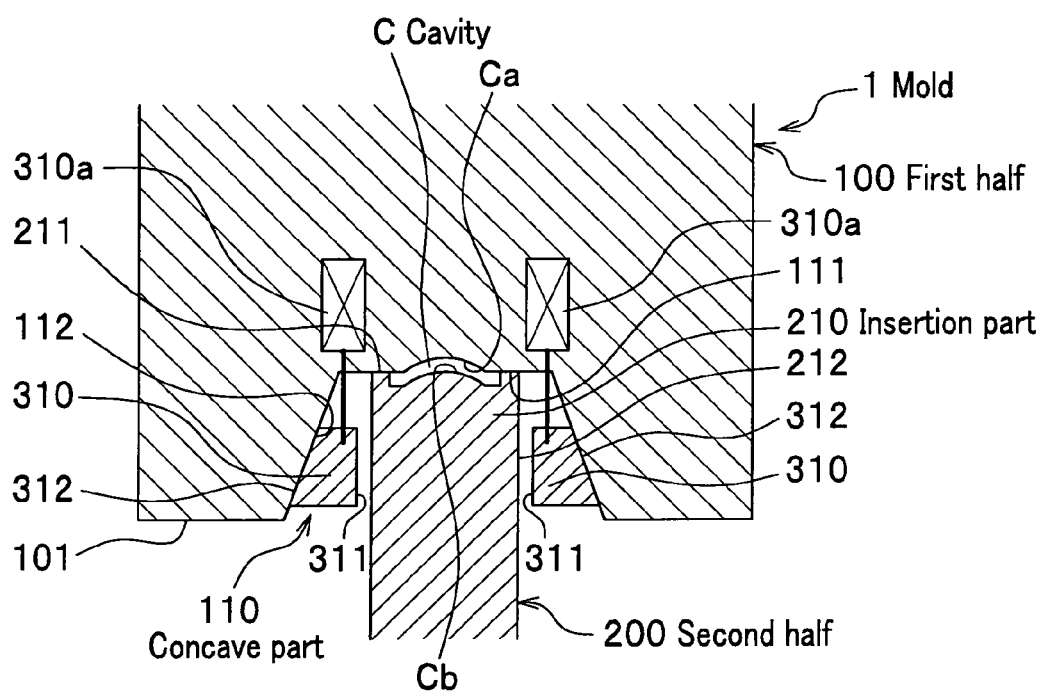

In the drawings to be referred to, FIG. 1A and FIG. 1B are views each showing a mold according to the first embodiment of the present invention. FIG. 1A is a plan view showing the mold before a center axis alignment is performed. FIG. 1B is a cross sectional view showing the mold when cut along the line A-A in FIG. 1A.

Figure 2A:
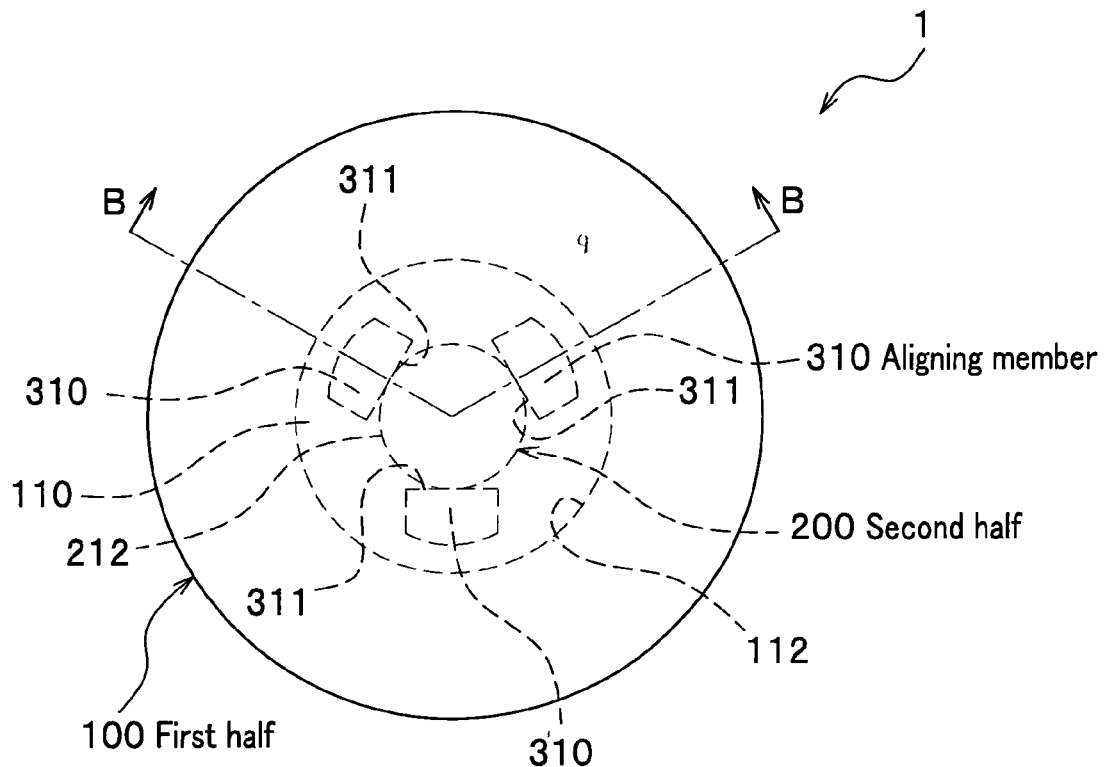
FIG. 2A and FIG. 2B are views each showing the mold according to the first embodiment.
Figure 2B:
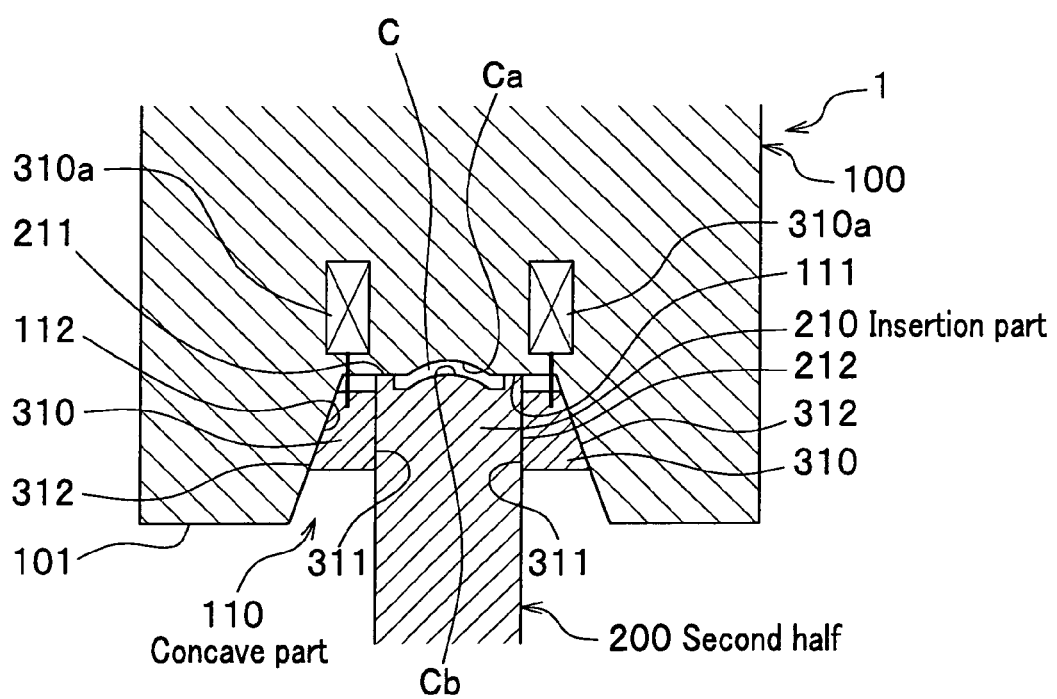

FIG. 2A and FIG. 2B are views each showing the mold according to the first embodiment. FIG. 2A is a plan view showing the mold after the center axis alignment is performed. FIG. 2B is a cross sectional view showing the mold when cut along the line B-B in FIG. 2A.

As shown in FIG. 1A and FIG. 1B, a mold 1 according to the first embodiment has a cavity C between a first half 100 and a second half 200 formed by closing the mold 1, and a lens L (which may be also referred to as a "product") is molded in the cavity C. In this embodiment, the second half 200 moves in a vertical direction with respect to the first half 100 (also in the vertical direction in FIG. 1B), and thus the mold 1 constituted by the first half 100 and the second half 200 can be opened and closed. The mold 1 also includes a plurality of aligning members 310 for performing the center axis alignment between the first half 100 and the second half 200.

The first half 100 is a metal member in a column-like shape as shown in FIG. 1A and FIG. 1B. A concave part 110 concaved upward is formed on a lower end face 101 of the first half 100. A cavity surface Ca is formed in the center of a top surface 111 of the concave part 110, and is exposed on the lower end face 101 of the first half 100.

An inner circumferential surface 112 of the concave part 110 is a tapered face constituting a conic surface. The inner circumferential surface 112 is one of the two reference parts for the center axis alignment between the first half 100 and the second half 200. In the first embodiment, an entire circumference of the inner circumferential surface 112 of the concave part 110 is referred to as the reference part. However, the reference part may be such a part that the aligning members 310 hereinafter described come in contact with the inner circumferential surface 112.

It is to be noted that the center of a circumference of the concave part 110 is aligned with that of a lens molded in the cavity C.

The first half 100 also includes a runner, a sprue, a gate, or the like, all of which are not shown, for feeding a molten plastic resin from a nozzle of a molding machine not shown to the cavity C.

The second half 200 is also a metal member in a column-like shape. As shown in FIG. 1B, an upper part of the second half 200 constitutes an insertion part 210, which is inserted into the concave part 110 of the first half 100 when the mold 1 is closed. A cavity surface Cb is formed in the center of an upper end surface 211 of the insertion part 210.

The insertion part 210 has a constant diameter from top through bottom, and loosely fits in with the concave part 110. Namely, when the mold 1 is closed, a space is left between the inner circumferential surface 112 of the concave part 110 and the outer circumferential surface 212 of the insertion part 210.

The outer circumferential surface 212 of the insertion part 210 is also one of the two reference parts for the center axis alignment between the first half 100 and the second half 200. In the first embodiment, an entire circumference of the outer circumferential surface 212 of the insertion part 210 is the reference part, however, the reference part may be such a part that the aligning members 310 hereinafter described come in contact with the outer circumferential surface 212.

The second half 200 includes an ejecting mechanism for demolding a lens from the cavity surface Cb, after the lens is molded in the cavity C, and then the first half 100 and the second half 200 are separated from each other. The ejecting mechanism used herein may have any of various known configurations, and is not shown in the embodiment.

The aligning members 310 are provided to perform the center axis alignment between the first half 100 and the second half 200 (see FIG. 2A).

As shown in FIG. 1A and FIG. 1B, each aligning member 310 is a metal member in a substantially-trapezoidal shape, which comes in contact with the inner circumferential surface 112 (one reference part) of the concave part 110 and the outer circumferential surface 212 (the other reference part) of the insertion part 210. Three aligning members 310 are herein provided at intervals of 120 degrees along the inner circumferential surface 112 of the concave part 110, and come in contact with the inner circumferential surface 112 of the concave part 110 and the outer circumferential surface 212 of the insertion part 210 in three directions.

An inner side surface 311 of each aligning member 310 facing the inside of the mold 1 has a planar surface parallel to the mold opening/closing direction as shown in FIG. 2A and FIG. 2B. The inner side surface 311 is configured to firmly contact the outer circumferential surface 212 (the other reference part) of the insertion part 210 in parallel and in a linear form. It is to be noted that the inner side surface 311 may have a curved surface in the form of a circular arc so that the inner side surface 311 firmly contacts the outer circumferential surface 212 in parallel to the mold opening/closing direction and in a planar form.

On the other hand, an outer side surface 312 of each aligning member 310 facing the outside of the mold 1 has a tapered surface so as to firmly contact the inner circumferential surface 112 of the concave part 110 (see FIG. 2B), when the aligning members 310 achieve the center axis alignment between the first half 100 and the second half 200. A curvature of the outer side surface 312 may be set to a value which allows the outer side surface 312 to firmly contact the inner circumferential surface 112 in a linear form.

In the first embodiment, each of the aligning members 310, which is inserted into a space between the concave part 110 of the first half 100 and the insertion part 210 of the second half 200, has the same shape. In the meantime, a space left between the concave part 110 and the insertion part 210 has the same radial width in any part. Thus, when each of the aligning members 310 is inserted into the space therebetween, the center axis alignment therebetween can be accordingly achieved.

Each of the aligning members 310 is subjected to a force parallel to the mold opening/closing direction by a driving unit 310a provided in the second half 200, and is thereby moved in the mold opening/closing direction.

Various known techniques can be used for the driving unit 310a to move the aligning members 310. In the first embodiment, an actuator such as an air cylinder is used to move the aligning members 310, after the first half 100 and the second half 200 are joined together.

It is to be noted that, when the center axis alignment between the concave part 110 and the insertion part 210 is performed using the aligning members 310, which are inserted therebetween, all the aligning members 310 must be inserted at the same timing.

In a molding method using the mold 1 according to the first embodiment, the driving unit 310a pulls the aligning members 310 upward in a state where the insertion part 210 is inserted into the concave part 110 when the mold 1 is closed. Then the aligning members 310 slides along the inner circumferential surface 112 of the concave part 110, and move toward the outer circumferential surface 212 of the insertion part 210.

At this time, if the center axis of the first half 100 and that of the second half 200 are out of alignment, the outer side surface 312 of one or two of the aligning members 310 is pressed against the inner circumferential surface 112 of the concave part 110, and the inner side surface 311 thereof is also pressed against the outer circumferential surface 212 of the insertion part 210.

This makes the first half 100 or the second half 200 pressed by one or two of the aligning members 310 to move in the lateral direction. Then each of the aligning members 310 comes in contact with the inner circumferential surface 112 of the concave part 110 and the outer circumferential surface 212 of the insertion part 210 in three directions. This enables the center axis alignment between the first half 100 and the second half 200.

At this time, the top surface 111 of the concave part 110 and the upper end surface 211 of the insertion part 210 are pressed against each other with a slight space left therebetween. This prevents the top surface 111 of the concave part 110 and the upper end face 211 of the insertion part 210 from rubbing against each other and being damaged, when the center axis alignment between the first half 100 and the second half 200 is performed. It is to be noted that, since a plastic material such as polycarbonate, polyester and acryl for molding a plastic optical lens is high in viscosity, the plastic material fed into the cavity C will not flow out through a space between the top surface 111 of the concave part 110 and the upper end face 211 of the insertion part 210.

After the center axis alignment between the first half 100 and the second half 200 is achieved, a mold clamping force is applied to the first half 100 and the second half 200 to firmly press the same against each other.

The mold 1 and the molding method described above can provide advantages as follows.

Figure 8A:
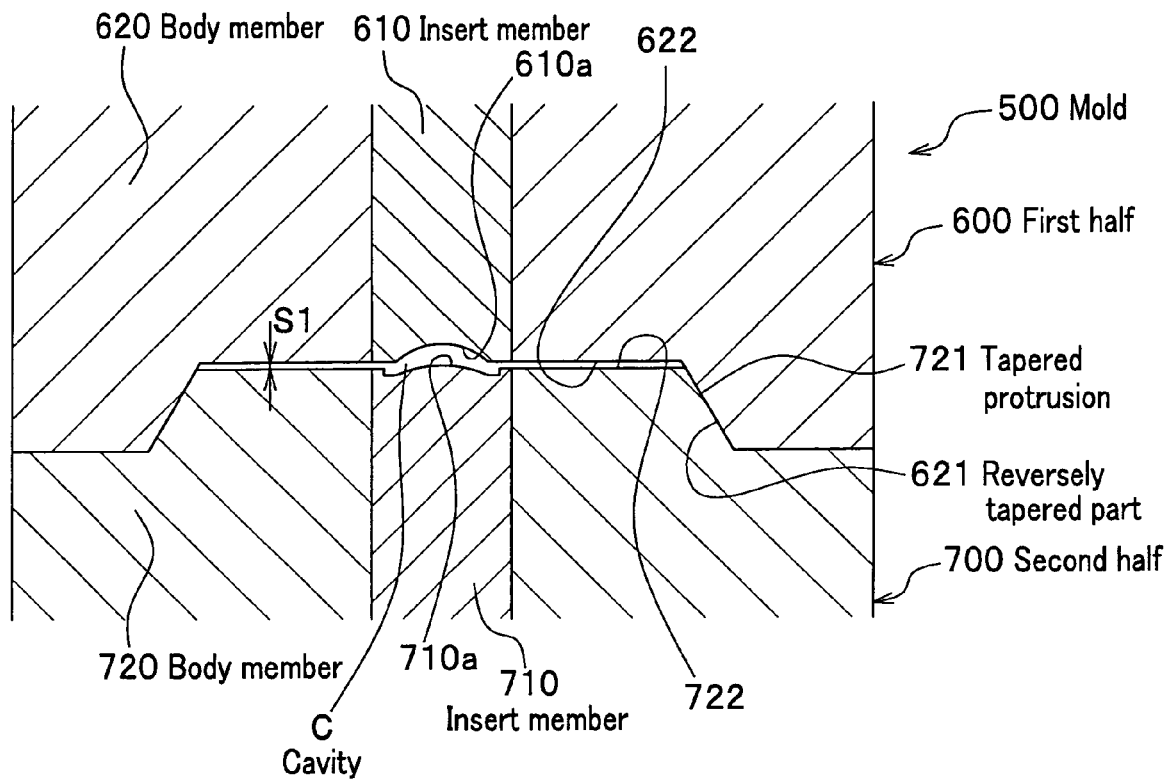
FIG. 8A and FIG. 8B are views each showing a mold according to the conventional technology.
Figure 8B:
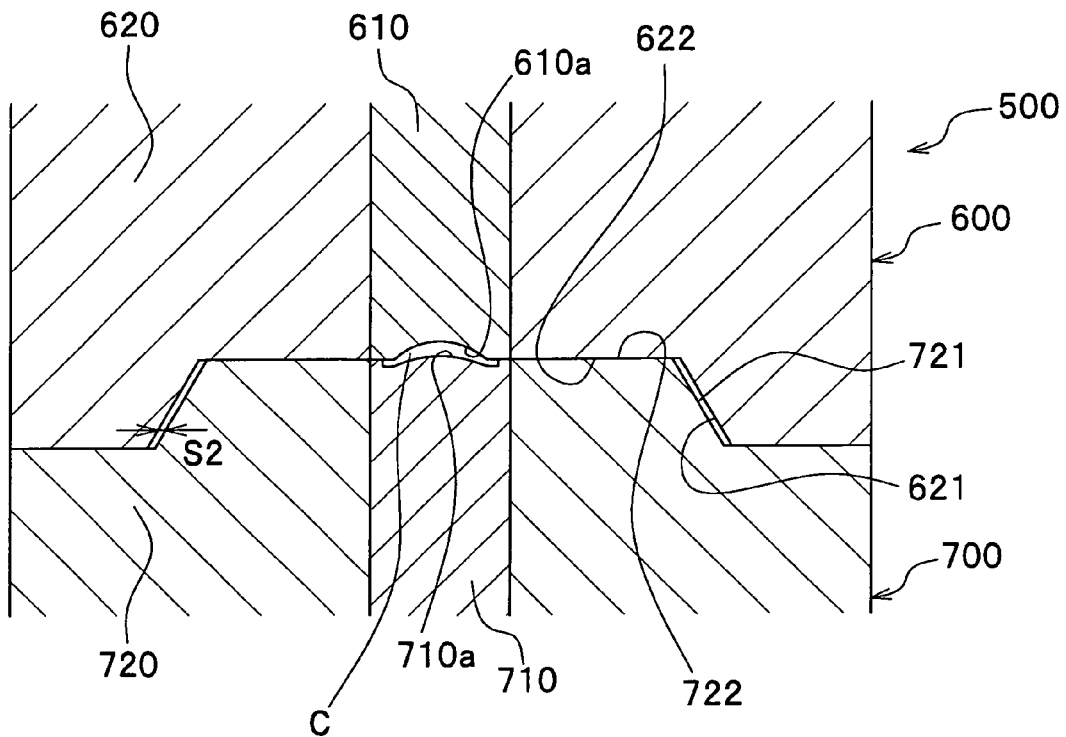

In the conventional mold, the fitted parts of the first half 100 and the second half 200 provide the center axis therebetween (see FIG. 8). However, according to the mold 1 and the molding method, as shown in FIG. 2A and FIG. 2B, the aligning members 310 achieve the center axis alignment between the first half 100 and the second half 200 in such a way that the aligning members 310 come in contact with the inner circumferential surface 112 (one of the two reference parts) of the concave part 110 of the first half 100 and the outer circumferential surface 212 (the other reference part) of the insertion part 210 of the second half 200 in three directions. That is, the center axis alignment achieved according to the present invention cannot be affected by the dimensional tolerance, which is accompanied by the use of fitted parts.

Thus, in the mold 1 and the molding method according to the first embodiment, the first half 100 and the second half 200 are configured to firmly fit in with each other, not leaving any space between the first half 100 and the second half 200 in the mold opening/closing direction. This enables an improved accuracy in the thickness of the lens and in the center axis alignment therebetween, namely, the interplanar eccentricity.

Further, unlike the conventional mold (see FIG. 8), it is not necessary to machine with high precision, a fitted part such as a tapered protrusion and a reversely tapered part on the first half 100 and the second half 200. This enables a cost reduction in manufacturing the mold 1.

In the conventional mold (see FIG. 8), the center axis alignment between the first half 100 and the second half 200 is performed in the course of closing the mold, using fitted parts provided on the mold or the like. On the other hand, in the mold 1 according to the first embodiment, the center axis alignment therebetween is performed after the mold is closed. This can prevent the aligning members 310 from sliding on the first half 100 and the second half 200, and result in a longer period of endurance of the mold 1 and an improved accuracy of the center axis alignment therebetween.

Further, because the aligning members 310 are moved by applying a force thereto in parallel to the mold opening/closing direction with respect to the aligning members 310, a width of the mold 1 can be made smaller. This is effective for arranging a plurality of the molds 1, allowing an increase in the number of the molds 1 which can be arranged in a given area.

The first embodiment according to the present invention has been described in detail with reference to the related drawings, however, the present invention is not limited to the first embodiment, and can be modified according to the necessity without departing from the gist of the present invention.

For instance, in the first embodiment, an example is described in which the present invention is applied to a mold for manufacturing a lens. However, the present invention is not limited to this, and can be applied to a mold for manufacturing, for example, a frame for holding a lens.

In the first embodiment, as shown in FIG. 1A, each of the aligning members 310 comes in contact with the inner circumferential surface 112 of the concave part 110 and the outer circumferential surface 212 of the insertion part 210 in three directions. This enables the center axis alignment between the first half 100 and the second half 200. However, more than three aligning members 310 can be provided. As long as the aligning members 310 come in contact with the inner circumferential surface 112 of the concave part 110 and the outer circumferential surface 212 of the insertion part 210 at least in three directions, the center axis alignment between the first half 100 and the second half 200 can be achieved.

Figure 3:
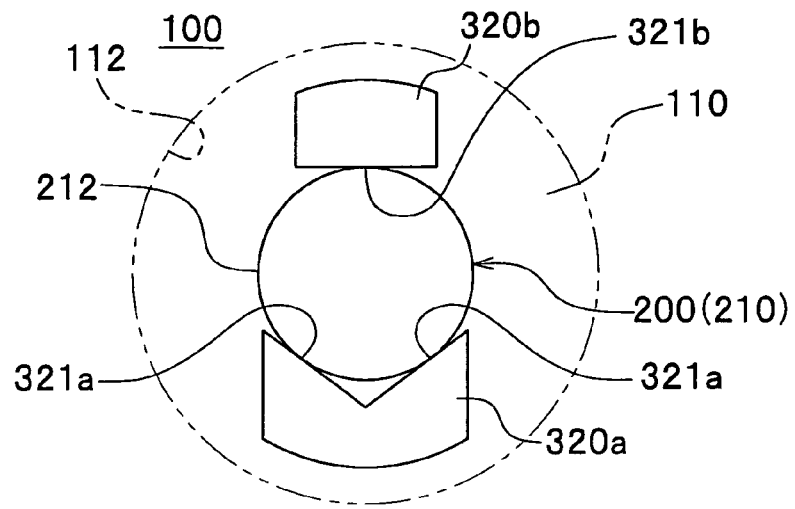
FIG. 3 is a cross sectional view showing a mold having another configuration according to the first embodiment, in which two members are each served as an aligning member.

In the first embodiment, as shown in FIG. 1A, one aligning member 310 has one dedicated contact part for coming in contact with the outer circumferential surface 212 of the insertion part 210. However, as shown in the plan view of FIG. 3, a configuration is available in which an aligning member 320a provided with two contact parts 321a, 321a and an aligning member 320b provided with one contact part 321b come in contact with the outer circumferential surface 212 of the insertion part 210.

Figure 4:
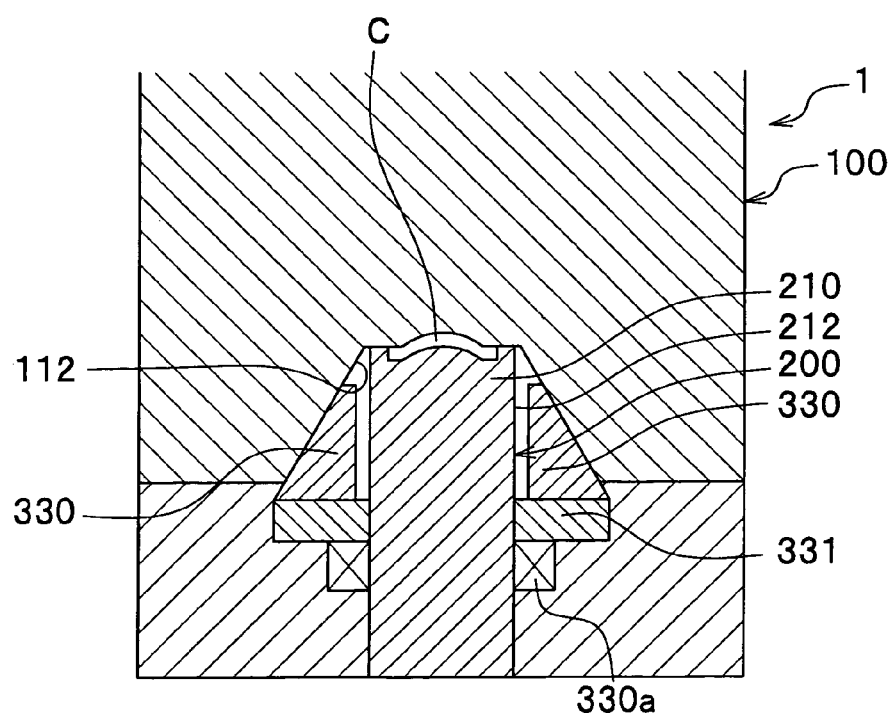
FIG. 4 is a cross sectional view showing a mold having a still another configuration according to the first embodiment, in which each aligning member is attached to an aligning member support unit.

As shown in the cross sectional view of FIG. 4, a configuration is available in which the aligning members 330 each in the movable state in the lateral direction are attached to a monolithic aligning member support unit 331, and a driving unit 330a moves the aligning member support unit 331 in the opening/closing direction. This enables all the aligning members 310 to move in synchronization.

With this configuration, when the aligning members 330 are inserted each between the inner circumferential surface 112 of the concave part 110 and the outer circumferential surface 212 of the insertion part 210, a relative position of the aligning members 330 is not changed. The aligning members 330 can be thus arranged in a suitable position for accurately performing an alignment of the insertion part 210. Therefore, the center axis alignment between the first half 100 and the second half 200 can be accurately performed. Movement of the aligning members 330 can also be easily controlled in this configuration.

In the first embodiment, as shown in FIG. 1A, three aligning members 310 are employed, however, a monolithic cylindrical pipe member can be employed instead. In this configuration, the monolithic aligning member 310 is pressed against the inner circumferential surface 112 of the concave part 110, and is elastically deformed to be curved toward the insertion part 210. This allows the aligning member 310 to come in contact with the outer circumferential surface 212 of the insertion part 210.

In the first embodiment, as shown in FIG. 1B, an actuator (not shown) such as an air cylinder is used as the driving unit 310a. However, various actuators such as, for example, a hydraulic cylinder, a solenoid coil, a piezoelectric element, and a spring member can be used.

The aligning members 310 can be configured to be pushed by a restoring force of a shape memory alloy, or by an expansive force of a hollow member into which a fluid such as air is injected.

Figure 5A:
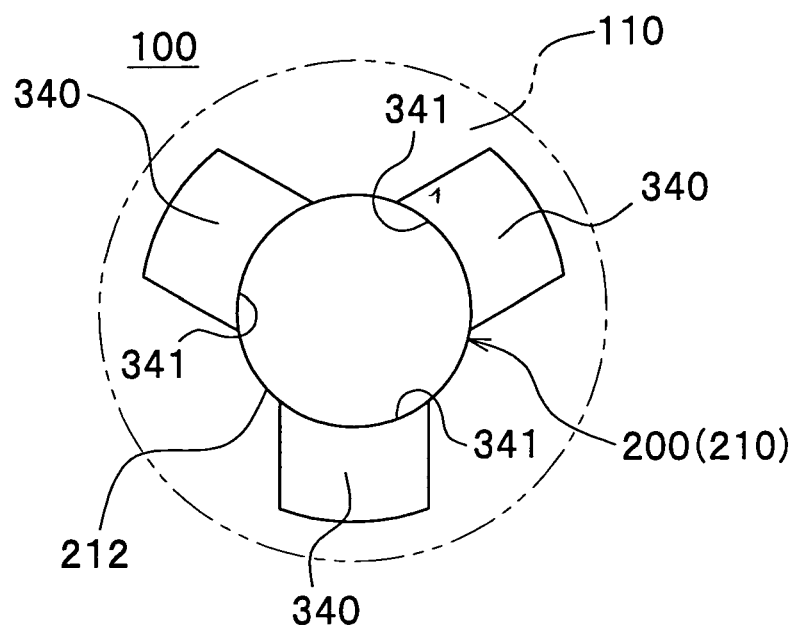
FIG. 5A is a plan view showing the mold in which a contact surface of each aligning member is curved.

In the first embodiment, as shown in FIG. 2A, the inner side surface 311 of each aligning member 310 has a plane surface in parallel to the mold opening/closing direction. However, an inner side surface 341 having a curved surface in the form of a circular arc can be formed. The inner side surface 341 of an aligning member 340 shown in the plan view of FIG. 5A is formed along the outer circumferential surface 212 of the insertion part 210, which has a circular cross section. With this configuration, the curved inner side surface 341 has a larger contact surface than the planar inner side surface 311 (see FIG. 2B), and thus the aligning member 340 can be firmly pressed against the outer circumferential surface 212 of the insertion part 210. It is to be noted that a curvature of the inner side surface 341 is preferably larger than that of the outer circumferential surface 212 of the insertion part 210. This advantageously makes it difficult for an edge in a circumferential direction of the inner side surface 341 to come in contact with the outer circumferential surface 212 of the insertion part 210. This can also specify a direction in which the inner side surface 341 presses the outer circumferential surface 212 of the insertion part 210.

Figure 5B:
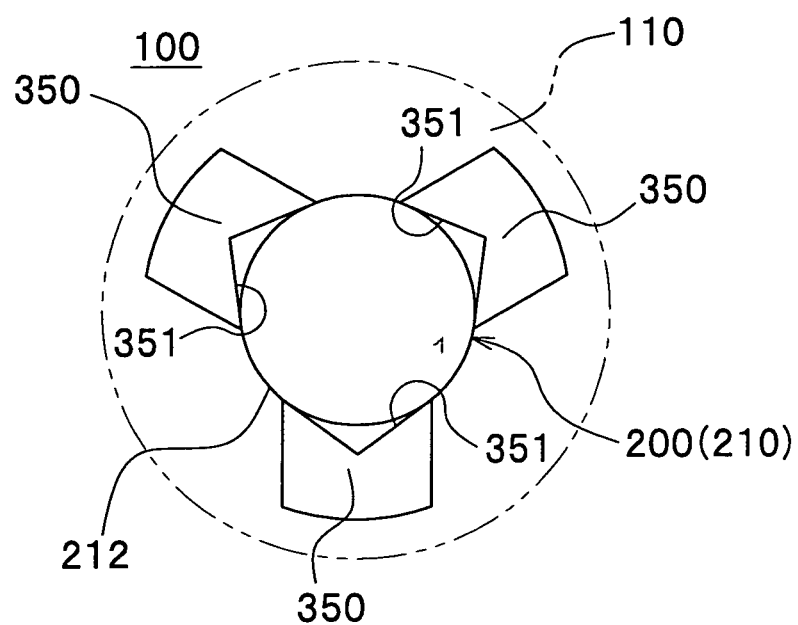
FIG. 5B is a plan view showing the mold in which each contact surface of the aligning members is V-shaped when viewed from above.

Further, an aligning member 350 shown in the plan view of FIG. 5B can be employed which has an inner side surface 351 in a V shape when viewed from above, into which a portion of the outer circumferential surface 212 of the insertion part 210 is accommodated.

In the first embodiment, as shown in FIG. 1B, a vertical molding machine is used in which the first half 100 and the second half 200 move in the vertical direction. However, a horizontal molding machine can also be used in which the first half 100 and the second half 200 move in the horizontal direction. In this case, gravity force is not provided to press one of the two halves (an upper positioned half) against the other (a lower positioned half). This can prevent fitting parts of the first half 100 and the second half 200 from being worn down, when the center axis alignment therebetween is performed after the mold is closed.

In the first embodiment, as shown in FIG. 1B, the driving unit 310a for the aligning members 310 is provided in the first half 100, however, may be provided in the second half 200.

In the first embodiment, one driving unit 310a moves one aligning member 310. However, one driving unit 310a may move a plurality of the aligning members 310. Additionally, if a plurality of the molds 1 is arranged, one driving unit 310a may also move all the aligning members 310 of the plurality of the molds 1. The driving unit 310a may also move any desired portion of the plurality of the molds 1.

A shape of each of the first half 100 and the second half 200 is not limited to a cylinder, but can have various shapes such as a prism.

A plurality of cavities C can be provided inside one mold 1.

An ejecting mechanism for demolding a lens after the mold 1 is opened is provided in the second half 200, however, may be provided in the first half 100.

Figure 6:
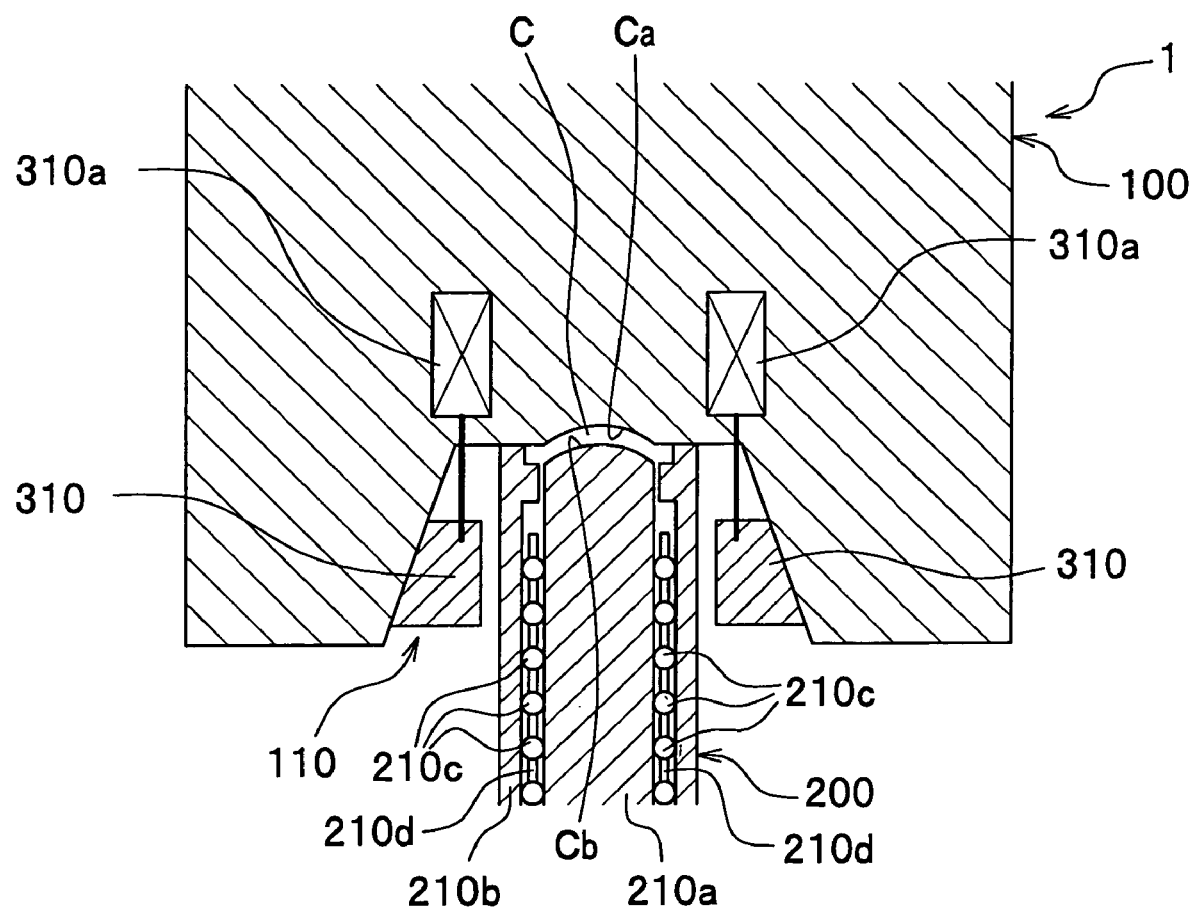
FIG. 6 is a cross sectional view showing a mold having another configuration according to the first embodiment, in which an insertion part is divided.

In the first embodiment, the insertion part 210 of the second half 200 is monolithic. However, as shown in the cross sectional view of FIG. 6, the insertion part 210 can be divided into a central insertion part 210a for molding an optical surface of a lens and an outer insertion part 210b for molding a flange of the lens. The central insertion part 210a is to be inserted into the tubular-shaped outer insertion part 210b. In this configuration, the center axis alignment is performed by interposing spherical members 210c each having the same diameter, and a retainer 210d for holding the spherical members 210c between the central insertion part 210a and the outer insertion part 210b. After the mold 1 is opened, the outer insertion part 210b is slid and pushed out with respect to the central insertion part 210a. Then the lens is demolded from a cavity surface Cb of the central insertion part 210a.

Second Embodiment

Next is described each configuration of a mold and a molding method according to a second embodiment.

Figure 7A:
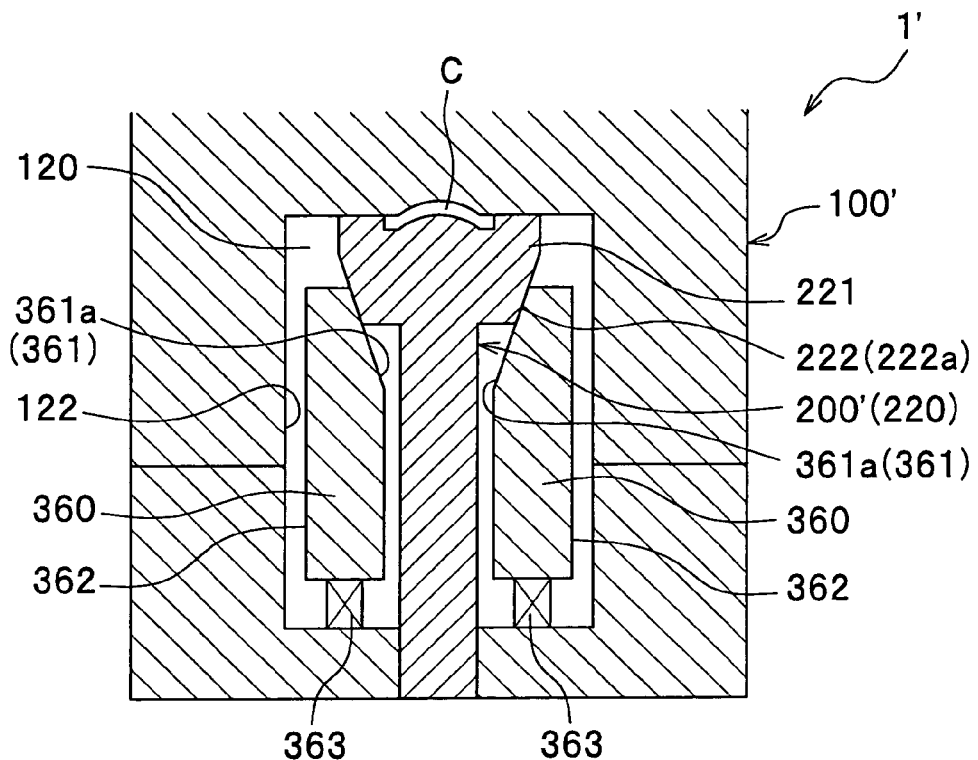
FIG. 7A and FIG. 7B are views each showing a mold according to a second embodiment of the present invention.
Figure 7B:
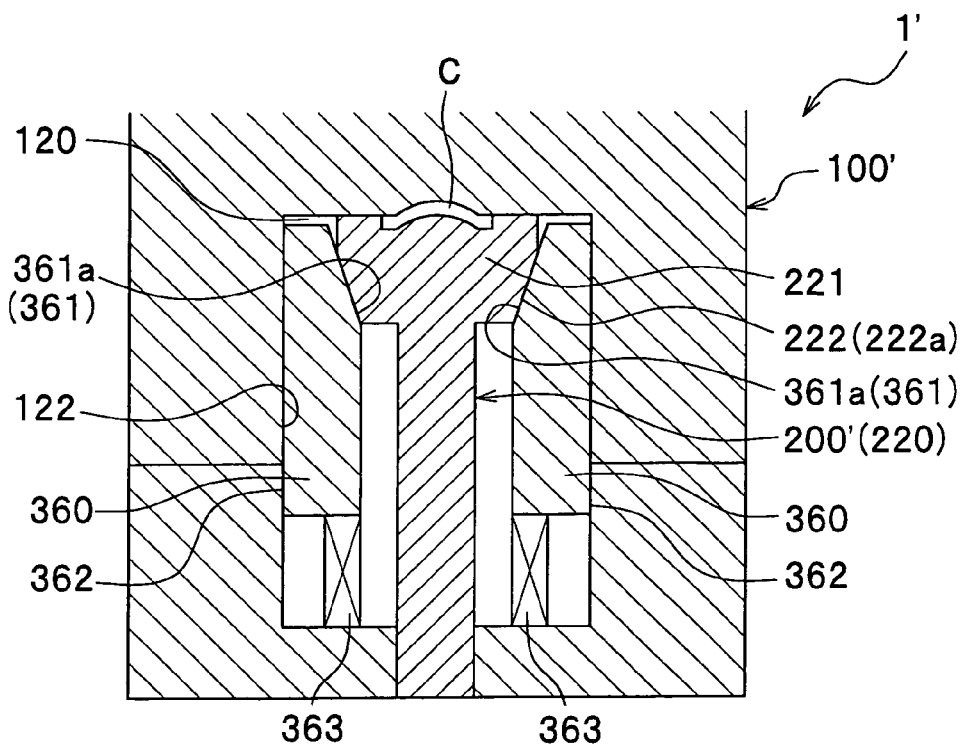

FIG. 7A and FIG. 7B are views each showing a mold according to the second embodiment of the present invention. FIG. 7A is a cross sectional view showing the mold before a center axis alignment is performed. FIG. 7B is a cross sectional view showing the mold after the center axis alignment is performed.

A mold 1' according to the second embodiment has substantially the same configuration as the mold 1 according to the first embodiment shown in FIG. 1A and FIG. 1B, except that a configuration of aligning members is different.

In the mold 1' according to the second embodiment, as shown in FIG. 7A, an inner circumferential surface 122 (one of the two reference parts) of a concave part 120 of the first half 100' has a tubular-shaped surface. Further, a diameter expanded part 221 having an expanded diameter is provided at an upper end of the insertion part 220 of the second half 200', and a tapered surface 222a (the other reference part) having an inverted conic shaped surface is formed at a lower part of the outer peripheral surface 222 of the diameter expanded part 221.

Each of the aligning member 360 according to the second embodiment has a tapered surface 361a corresponding to the tapered surface 222a formed on the outer peripheral surface 222 of the insertion part 220, on an inner side surface 361 thereof facing the inside of the mold 1'. Each of the aligning members 360 can thus slide up and down on the tapered surface 222a formed on the outer circumferential surface 222 of the insertion part 220. In each of the aligning members 360 in the meantime, an outer side surface 362 facing a side face of the mold 1' has a vertical surface corresponding to the inner circumferential surface 122 of the concave part 120.

As shown in FIG. 7B, after the mold 1' is closed, in a state where the insertion part 220 is inserted into the concave part 120, each driving unit 363 on the side of the second half 200' pushes the respective aligning members 360 in the mold closing direction (upward). Then each of the aligning members 360 slides along the tapered surface 222a formed on the outer circumferential surface 222 of the insertion part 220, and moves toward the inner circumferential surface 122 of the concave part 120.

With this configuration, when the center axis of the first half 100' and that of the second half 200' are out of alignment, the outer side surface 362 of one or two aligning members 360 is pressed against the inner circumferential surface 122 of the concave part 120. In the meantime, the inner side surface 361 thereof is also pressed against the tapered surface 222a formed on the outer circumferential surface 222 of the insertion part 220. This allows each of the aligning members 360 to come in contact with the inner circumferential surface 122 of the concave part 120 and the outer circumferential surface 222 of the insertion part 220 in three directions. As described above, the center axis of the first half 100' and that of the second half 200' are aligned to thereby perform the center axis alignment therebetween.

In the mold 1' and the molding method according to the second embodiment, the center axis alignment between the first half 100' and the second half 200' is performed, when the mold 1' is closed, as in the case of the mold 1 and the molding method according to the first embodiment (see FIG. 2). Namely, the aligning members 360 come in contact with the inner circumferential surface 122 (one of the two reference parts) of the concave part 120 of the first half 100' and the outer circumferential surface 222 (the other reference part) of the insertion part 220 of the second half 200' in three directions. That is, the center axis alignment therebetween can be provided without being affected by the dimensional tolerance of the fitted parts of the first half 100' and the second half 200'. This enables an accurate center axis alignment therebetween. Thus the first half 100' and the second half 200' can be configured to precisely fit in with each other, not leaving any space therebetween in the mold opening/closing direction. This allows an improved accuracy in the lens thickness and in the center axis alignment therebetween, namely, the interplanar eccentricity.

According to the second embodiment, the center axis alignment between the first half 100' and the second half 200' is performed, after the mold 1' is closed. This can prevent the aligning members 360 from sliding on the first half 100' and the second half 200'. This also results in a longer period of endurance of the mold 1' and an improved accuracy of the center axis alignment between the first half 100' and the second half 200'.

Further, because the aligning members 310 are moved by applying a force thereto in parallel to the mold opening/closing direction with respect to the aligning members 310, a width of the mold 1' can be made smaller. This is advantageous for arranging a plurality of the molds 1', allowing an increase in the number of the molds 1' which can be arranged in a given area.

The second embodiment according to the present invention has been described above in detail with reference to the related drawings. However, the present invention is not limited to the second embodiment, and can be modified according to the necessity without departing from the gist of the present invention, like the first embodiment.

For example, the aligning member 360 can be a monolithic tubular pipe member whose one end is three or more forked. In this case, an outer circumference of the monolithic aligning member 360 is made slightly smaller than an inner circumference of the concave part 120. This enables the aligning member 360 to be inserted between the concave part 120 and the insertion part 210. Then the expanded dimension part 221 of the insertion part 220 presses and slightly broadens the aligning member 360. This allows the aligning member 360 to press the inner circumferential surface 122 of the concave part 120 and the outer circumferential surface 222 of the insertion part 220, providing a simpler configuration of the aligning member 360.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

The invention claimed is:

1. A mold for molding a product, in which a cavity is formed by closing the mold, comprising:
   a first half and a second half each having a cavity surface, wherein the first half includes a concave part having the cavity surface, and the second half includes an insertion part having a cavity surface; and
   a plurality of aligning members to come in contact with each side circumferential surface of the first half and the second half at least in three directions, when the mold is closed,
   wherein, after the mold is closed, in a state where the insertion part is inserted into the concave part, a center axis alignment between the first half and the second half is performed in such a way that each of the aligning members is made to come in contact with the inner circumferential surface of the concave part and the outer circumferential surface of the insertion part by pressing at least one of the aligning members against the inner circumferential surface of the concave part and the outer circumferential surface of the insertion part, and
   a moving means configured to move the aligning members after the mold is closed.

2. The mold according to claim 1, wherein the aligning members moves in a mold-closing direction to come in contact with the inner circumferential surface of the concave part and the outer circumferential surface of the insertion part.

3. The mold according to claim 1, wherein a tapered surface for guiding the aligning members toward the outer circumferential surface of the insertion part is provided on the inner circumferential surface of the concave part.

4. The mold according to claim 2, wherein a tapered surface for guiding the aligning members toward the outer circumferential surface of the insertion part is provided on the inner circumferential surface of the concave part.

5. The mold according to claim 1, wherein a tapered surface for guiding the aligning members toward the inner circumferential surface of the concave part is provided on the outer circumferential surface of the insertion part.

6. The mold according to claim 2, wherein a tapered surface for guiding the aligning members toward the inner circumferential surface of the concave part is provided on the outer circumferential surface of the insertion part.

7. A molding method using the mold according to claim 1, comprising the step of, after the aligning members perform the center axis alignment between the first half and the second half, applying a mold clamping force to the first half and the second half.

8. A molding method using the mold according to claim 2, comprising the step of, after the aligning members perform the center axis alignment between the first half and the second half, applying a mold clamping force to the first half and the second half.

9. A molding method using the mold according to claim 3, comprising the step of, after the aligning members perform the center axis alignment between the first half and the second half, applying a mold clamping force to the first half and the second half.

10. A molding method using the mold according to claim 4, comprising the step of, after the aligning members perform the center axis alignment between the first half and the second half, applying a mold clamping force to the first half and the second half.

11. A molding method using the mold according to claim 5, comprising the step of, after the aligning members perform the center axis alignment between the first half and the second half, applying a mold clamping force to the first half and the second half.

12. A molding method using the mold according to claim 6, comprising the step of, after the aligning members perform the center axis alignment between the first half and the second half, applying a mold clamping force to the first half and the second half.

\* \* \* \* \*